(No Model.)
W. S. COOPER.
FAUCET.
No. 280,137. Patented June 26, 1883.
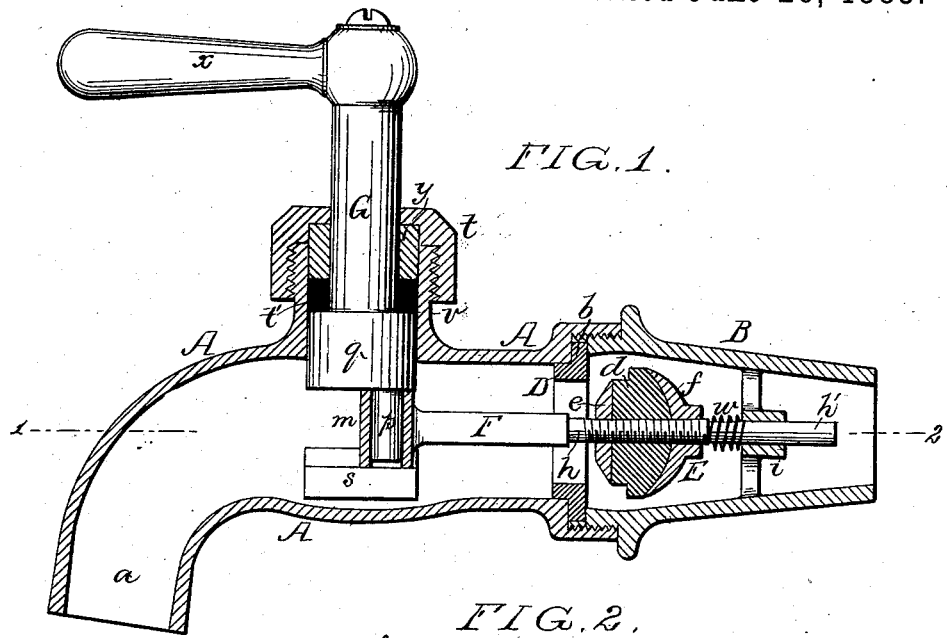
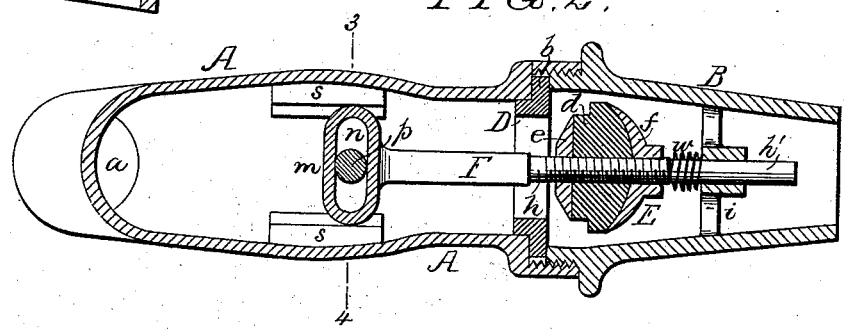
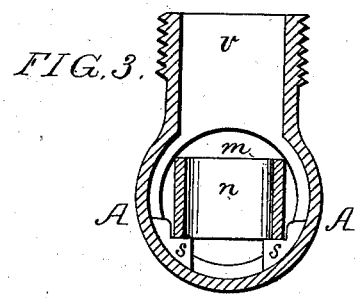
Witnesses,
David S. Williams
Harry Drury
Inventor:
William S. Cooper
by his Attorneys
Howson and Sons

UNITED STATES PATENT OFFICE.

WILLIAM S. COOPER, OF PHILADELPHIA, PENNSYLVANIA.

FAUCET.

SPECIFICATION forming part of Letters Patent No. 280,137, dated June 2, 1883.

Application filed September 17, 1881. (No model.)

*To all whom it may concern:*

Be it known that I, WILLIAM S. COOPER, a citizen of the United States, residing in Philadelphia, Pennsylvania, have invented certain Improvements in Faucets, of which the following is a specification.

My invention consists of a faucet, made in the peculiar manner fully described hereinafter, with a view to simplicity in construction, efficiency of action, and durability.

In the accompanying drawings, Figure 1 is a sectional view of my improved faucet; Fig. 2, a sectional plan on the line 1 2, and Fig. 3 a transverse section on the line 3 4.

The body A of the faucet may terminate in the usual spout, a, or may be otherwise constructed for connection to a pipe. Into the rear end of the body is screwed the end of the valve-chest B, against the flange b of a rubber ring, D, which thus serves the purpose of both packing and valve-seat, E being the valve, composed of a rubber block, d, interposed and confined between the two metal washers e and f, which are screwed onto the threaded portion h of the valve-spindle F, the plain portion h' of the latter being adapted to a guide, i, cast in the chest, so as not to materially interrupt the flow of liquid through the same.

To a transverse slot, n, in the termination m of the valve-spindle is adapted a pin, p, projecting from and situated eccentrically on the enlargement q of the shaft G, which is furnished at the top with a suitable handle, and which passes through a cap, t, screwed onto the branch v of the faucet, and through a ring, y, and packing t', interposed between the enlargement of the shaft and the said ring y, the said enlargement fitting snugly, but so as to turn freely in the branch v of the faucet.

Guides s s are cast in opposite sides of the body of the faucet for the lateral guidance of the slotted termination of the valve-spindle, which termination is retained in its proper position vertically by the said guides s s, and by the under side of the enlargement q of the shaft G.

Owing to the eccentricity of the pin p in respect to the shaft G, the valve may be brought to or removed from its seat by manipulating the handle x, and the valve can be readily adjusted on the valve-spindle to accord with the desired extent of movement of the handle.

In order to prevent lost motion and drumming of the valve when the eccentric pin p becomes a little worn, I prefer to interpose between the valve and the bearing i a spring, w, the tendency of which is to keep the slotted termination m of the valve-stem pressed firmly against the pin at all times.

By making both the valve d and valve-seat b of rubber I overcome an objection to faucets in which one of these parts is of metal, for in such cases there is a tendency of the valve to stick to its seat when the faucet is allowed to remain closed for a time.

I claim as my invention—

1. A faucet in which a shaft, G, provided with an eccentric pin, p, is combined with a valve-spindle, F, laterally guided at both ends, and having a slotted termination, m, adapted to the eccentric pin, and a valve adapted to a seat in the faucet, as set forth.

2. The combination, in a faucet, of the shaft G and its eccentric pin p with the guided valve-spindle F and its valve E, made adjustable to and fro on the spindle, as specified.

3. The combination, in a faucet, of the body A, having a branch, v, a stuffing-box thereon, the shaft G, having an enlargement, q, adapted to said branch, and having an eccentric pin, p, and the guided valve-spindle F, having a slotted termination, m, as set forth.

In testimony whereof I have signed my name to this specification in the presence of two subscribing witnesses.

WILLIAM S. COOPER.

Witnesses:
HARRY DRURY,
HARRY SMITH.